(No Model.) 2 Sheets—Sheet 1.
C. FROELICH.
RAILWAY SWITCH.
No. 519,082. Patented May 1, 1894.
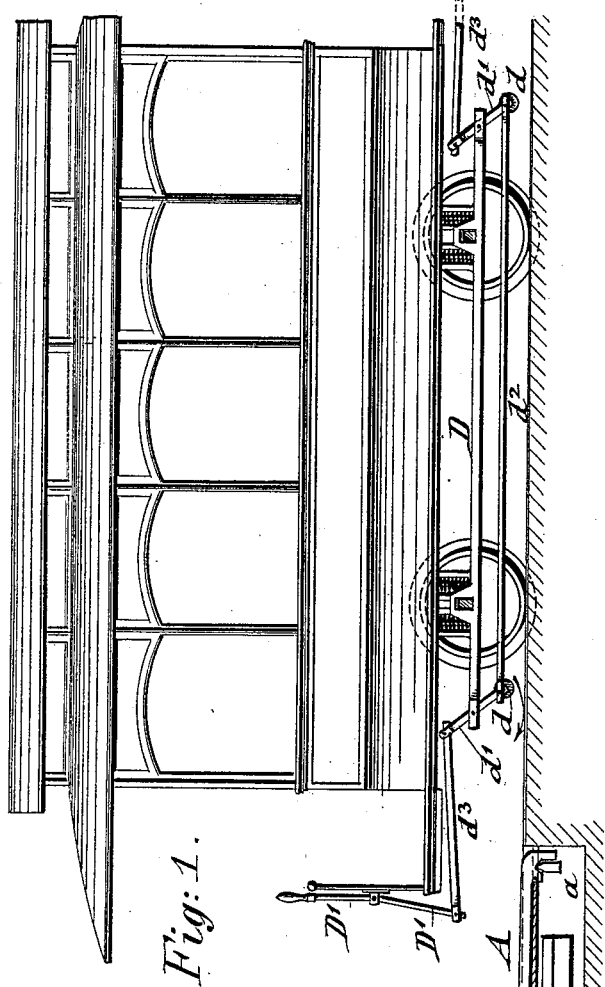
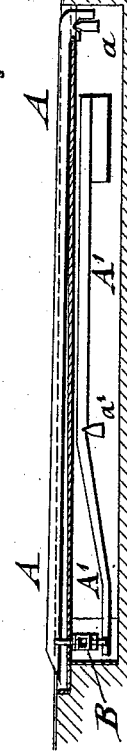
WITNESSES:
Carl Kable
K. R. Brennan
INVENTOR
Christopher Froelich
BY
Gospel & Jaegener
ATTORNEYS.
THE NATIONAL LITHOGRAPHING COMPANY,
WASHINGTON, D. C.

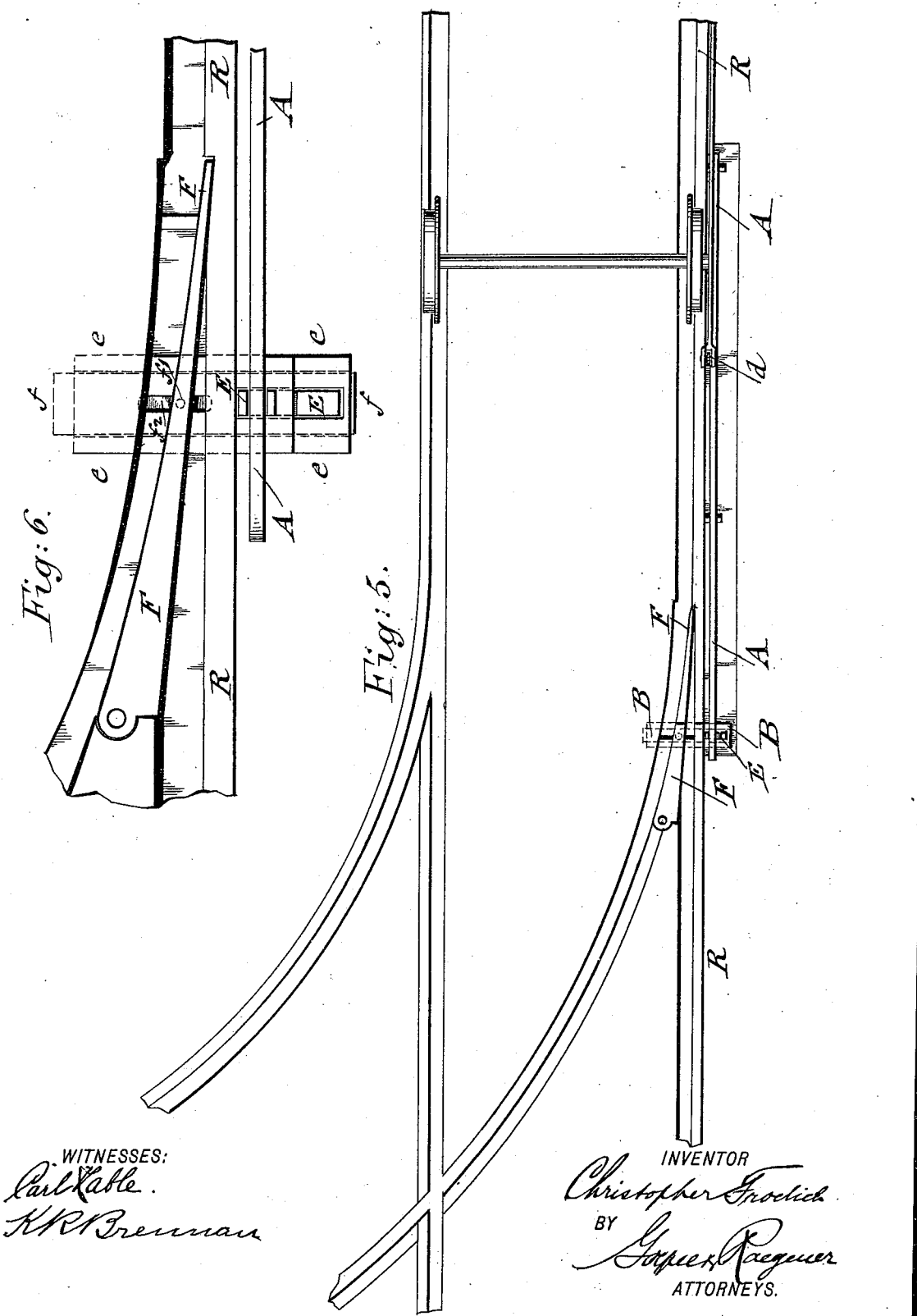

UNITED STATES PATENT OFFICE.

CHRISTOPHER FROELICH, OF BROOKLYN, NEW YORK.

RAILWAY-SWITCH.

SPECIFICATION forming part of Letters Patent No. 519,082, dated May 1, 1894.

Application filed January 5, 1894. Serial No. 495,799. (No model.)

*To all whom it may concern:*

Be it known that I, CHRISTOPHER FROELICH, a citizen of the United States, residing in Brooklyn, in the county of Kings and State of New York, have invented certain new and useful Improvements in Railway-Switches, of which the following is a specification.

This invention relates to an improved switch for street and other railways in which the switch-tongue is moved in a very reliable and effective manner from one side to the other, according to the direction in which the car is running; and the invention consists of a railway switch which comprises a fulcrumed actuating-rail that is arranged alongside of the track-rail, a counterbalancing lever for said actuating rail, means arranged below the car and adapted to be lowered when the actuating-rail is to be depressed, and a shifting mechanism which is connected with the switch-tongue and the higher end of the actuating-rail and adapted to be operated by the actuating-rail.

The invention consists further of the special construction of the switch-tongue actuating-mechanism, which will be fully described hereinafter and finally pointed out in the claims.

In the accompanying drawings, Figure 1, represents a side-elevation of a street railway car showing the means for actuating my improved railway-switch, the actuating-rail and its connection with the switch-tongue operating mechanism being shown in vertical longitudinal section. Figs. 2, 3, and 4, are respectively an end elevation, partly in section through the inclosing casing and vertical transverse sections on line 3—3, and 4—4, Fig. 2, showing the switch-tongue mechanism respectively before and after the same is operated by the actuating-rail. Fig. 5, is a plan-view of the track showing the relative position of the actuating-rail and switch-tongue operating mechanism to the rails and switch-tongue and Fig. 6, is a plan-view of the switch-tongue and its operating mechanism, drawn on a larger scale.

Similar letters of reference indicate corresponding parts.

Referring to the drawings, A represents a switch-actuating rail which is arranged alongside of the main-rail of the track and parallel therewith, said rail resting at the end farthest from the switch-tongue on a knife-edged fulcrum, *a*, while its opposite end is connected with the switch-tongue mechanism B. The lower end of the switch-tongue operating mechanism B is connected with a weighted lever A', which is supported on a knife-edged fulcrum *a'* and which serves for returning the actuating-rail A and the switch-tongue operating mechanism B into normal position after the same have been depressed by a suitable mechanism which is located below each car-body.

The actuating-rail A and the weighted lever by which the counter-balancing of the same and the switch-tongue operating mechanism B is produced, are inclosed in a suitable sheet-metal casing, so as to be protected against exterior injuries and obstructions, the actuating rail being so arranged as to project at the end adjacent to the switch-tongue slightly above the top of the rail.

The mechanism by which the actuating-rail A is depressed, is arranged below the body of each car, and is composed of a roller *d* that is applied to a lever *d'* which is fulcrumed to a fixed longitudinal frame D at each end of the car body, said rollers being connected by a steadying-rod $d^2$ which is pivoted to the lower ends of the fulcrumed levers *d'*. The upper end of each lever *d'* is connected by a pivot-rod $d^3$ with a lever D' that is fulcrumed at the end of the car, the lever D' being operated by the attendant whenever the switch is to be operated. By pulling the lever, the roller *d* is moved in forward and downward direction so as to bear on the actuating-rail and lower the higher end of the same against the counteracting influence of the weighted lever A'. The higher end of the actuating-rail A is gradually depressed so that the switch-tongue operating mechanism B is operated and the tongue moved into the position, shown in Figs. 5 and 6, so that the car can pass from one track to the other track. As soon as the pressure of the roller *d* on the actuating-rail A is released, the latter and the switch-tongue operating mechanism B are returned into normal position, ready to be actuated by the next car that passes over the same.

The switch-tongue operating mechanism B is composed of a stationary guide-piece $e$, a longitudinal shifting-piece $f$ and a cross-shaped slide-piece E. The stationary guide-piece $e$ is made of square cross-section and provided with an opening that extends longitudinally through the same. In the hollow guide-piece $e$ is located a shifting-piece $f$ that corresponds in cross-section to the opening of the guide-piece $e$, said shifting-piece being engaged by a pin $f'$ that is applied to the under side of the switch-tongue F, as shown clearly in Figs. 4 and 6. The pin $f'$ passes through a slot $f^2$ which is arranged in the upper part of the guide-piece $e$, while the switch-tongue F is guided in the space between the main-rail R and the pavement or an inside rail in the usual manner. The adjacent ends of the guide-casing $e$ and the shifting-piece $f$ are recessed in such a manner as to guide a vertically-reciprocating slide-piece E of approximately cross-shaped section, one leg or bar of which is made vertical and recessed or forked at its upper and lower ends, while the other leg or bar is arranged at an inclination toward the vertical leg and cut off horizontally at the ends, as shown clearly in Figs. 3 and 4. The upper recessed end of the vertical leg of the slide-piece E is engaged by the higher end of the actuating-rail A, while the recessed lower end of the vertical leg of the slide-piece E is engaged by the end of the weighted balancing-lever A'. When the slide-piece E is pressed in downward direction by the lowering of the actuating-rail A, the inclined leg of the same slides along the corresponding recesses of the guide-casing $e$ and the shifting-piece $f$ and moves the latter, owing to the stationary position of the guide-casing, in forward direction and simultaneously therewith, the switch-tongue F, by the pin $f'$, so as to shift the switch-tongue into the position shown in Figs. 5 and 6. As soon as the car has passed from one track to the other, the pressure of the roller $d$ on the actuating-rail A is relaxed, the latter is returned into its normal position by the action of its balancing-lever A', which also lifts the cross-shaped slide-piece E, and returns the longitudinal shifting-piece $f$ and the switch-tongue F into normal position, so as to clear the rail of the main-track. The recesses in the upper and lower end of the guide-casing $e$ and in the adjacent end of the shifting-piece $f$ correspond to the shape of the slide-piece E, so that the shifting-piece $f$ and the switch-tongue F follow easily the vertical down and up motion of the slide-piece E and produce thereby the shifting of the switch-tongue in a reliable and effective manner, without the use of springs of any kind.

As the switch-tongue operating mechanism is inclosed by the same casing which incloses the balancing lever B, it is protected against the admission of obstructions which may impair the regular working of the same.

The advantages of my improved railway-switch are that the same can be operated with great facility whenever the switch is to be shifted, by a suitable depressing mechanism on the car, which is lowered when the switch is approached, or set into lowered position, so as to operate the switch automatically, as the case may be. Further, as the switch-operating mechanism is made without springs, the parts are not liable to get out of repair, and form a durable and effective switch-operating device. The switch-tongue operating device can be removed bodily from the casing, in case it requires repairs, so as to be taken apart for being cleaned or repaired, after which it is readily placed in position, so that the switch is ready for work.

All or nearly all the parts of the switch-tongue operating mechanism can be made of cast metal and are readily assembled, so that the switch can be furnished at a comparatively low price.

Having thus described my invention, what I claim as new, and desire to secure by Letters Patent, is—

1. The combination, with an actuating-rail, arranged alongside of the track-rail, of a fulcrumed counter balancing lever below the actuating-rail, a pivoted switch-tongue and mechanism interposed between the actuating-rail and its counter-balancing lever and connected with said switch-tongue, substantially as set forth.

2. The combination, of an actuating-rail that is fulcrumed at one end and slightly lifted above the track rail at the opposite end, a weighted counter-balancing lever below the actuating-rail, a switch-tongue operating mechanism having a vertically sliding member that is engaged at its upper end by said actuating-rail, at its lower end by the counter-balancing lever, and a pivoted switch-tongue that is connected to said mechanism, substantially as set forth.

3. The combination, with an actuating-rail, and its weighted counter-balancing lever, of a switch-tongue operating mechanism, composed of a guide-casing, a longitudinal shifting-piece, guided in said casing and a cross-shaped slide piece guided in recesses of the casing and shifting piece and connected with the actuating-rail and the balancing lever respectively at its upper and lower ends, and a pivoted switch-tongue connected with the longitudinal shifting-piece, so that the switch-tongue is operated by the vertically-reciprocating motion of the slide-piece, substantially as set forth.

4. The combination, of an actuating-rail arranged alongside of the track-rail, a fulcrumed and weighted counter-balancing lever arranged below the actuating-rail, a switch-tongue operating mechanism provided with a cross shaped slide-piece that is engaged at its upper and lower ends respectively by the actuating-rail and its balancing lever, a stationary guide-piece for said slide-piece, a longitudinal shifting-piece guided in said casing and actuated by the inclined leg or portion of the slide-piece, a pivoted switch-tongue and a pin connecting the switch-tongue with the longitudinal shifting-piece, substantially as set forth.

In testimony that I claim the foregoing as my invention I have signed my name in presence of two subscribing witnesses.

CHRISTOPHER FROELICH.

Witnesses:
PAUL GOEPEL,
K. R. BRENNAN.